(12) United States Patent
Gull et al.

(10) Patent No.: US 7,471,505 B2
(45) Date of Patent: Dec. 30, 2008

(54) DO-IT-YOURSELF SYSTEM FOR PORTABLE GENERATOR

(75) Inventors: Philip Gull, New Berlin, WI (US); Wesley C. Sodemann, Dousman, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 430 days.

(21) Appl. No.: 11/384,651

(22) Filed: Mar. 20, 2006

(65) Prior Publication Data

US 2006/0250759 A1 Nov. 9, 2006

Related U.S. Application Data

(63) Continuation-in-part of application No. 10/784,370, filed on Feb. 23, 2004, now Pat. No. 7,015,404.

(51) Int. Cl.
*H02B 1/01* (2006.01)

(52) U.S. Cl. .................. 361/627; 307/140; 200/43.16; 200/50.32

(58) Field of Classification Search ................ 361/627, 361/641, 643, 647; 200/43.01, 43.16–43.22, 200/43.11, 50.32, 50.28; 224/901.2; 439/638; 307/328, 140, 43, 85
See application file for complete search history.

(56) References Cited

U.S. PATENT DOCUMENTS

| | | | |
|---|---|---|---|
| 2,229,729 A | 1/1941 | Emde | |
| 2,865,017 A | 12/1958 | Heikes | |
| 2,997,691 A | 8/1961 | Stoll | |
| 3,041,420 A | 6/1962 | Berry et al. | |
| 3,631,324 A | 12/1971 | Jones | |
| 3,641,487 A | 2/1972 | Rogers et al. | |
| 3,647,997 A | 3/1972 | Nerem | |
| 3,808,456 A * | 4/1974 | Kay et al. | 307/14 |
| 3,936,782 A | 2/1976 | Moakler et al. | |
| 4,013,849 A | 3/1977 | Brown | |
| 4,021,678 A | 5/1977 | Moakler et al. | |
| 4,157,461 A | 6/1979 | Wiktor | |
| 4,297,551 A | 10/1981 | Ronk | |
| 4,423,336 A | 12/1983 | Iverson et al. | |
| 4,672,227 A | 6/1987 | Lagree et al. | |
| 4,760,278 A | 7/1988 | Thomson | |
| 4,946,096 A | 8/1990 | Ballard et al. | |
| 5,208,584 A | 5/1993 | Kaye et al. | |
| 5,324,897 A * | 6/1994 | Melgoza et al. | 200/43.11 |

(Continued)

*Primary Examiner*—Jayprakash N Gandhi
*Assistant Examiner*—Courtney L Smith
(74) *Attorney, Agent, or Firm*—Michael Best & Friedrich LLP (57) ABSTRACT

A power interface operable to direct power from one of a first source and a second source to a load. The power interface includes a support plate, and a switch extending through the support plate. The switch is electrically connected to the first source and to the load and is movable between a first switch position in which power from the first source is directed to the load, and a second switch position in which power from the first source is inhibited from reaching the load. An electrical connector is electrically connectable to the load and is connectable to the second source to facilitate the delivery of power from the second source to the load. A movable cover is movable between a first cover position in which the cover inhibits connection between the electrical connector and the second source and a second cover position.

23 Claims, 7 Drawing Sheets

U.S. PATENT DOCUMENTS

| | | | |
|---|---|---|---|
| 5,397,868 A | 3/1995 | Smith et al. | |
| 5,424,587 A * | 6/1995 | Federowicz | 307/140 |
| 5,483,108 A | 1/1996 | Girard et al. | |
| 5,486,664 A | 1/1996 | Lamp et al. | |
| 5,515,235 A | 5/1996 | Stoller | |
| D372,224 S * | 7/1996 | Larned et al. | D13/173 |
| 5,543,593 A * | 8/1996 | Turek | 200/43.11 |
| 5,612,596 A | 3/1997 | Wiese | |
| 5,659,305 A | 8/1997 | Rains et al. | |
| 5,723,832 A * | 3/1998 | Hall | 200/43.16 |
| 5,761,027 A | 6/1998 | Flegel | |
| 5,894,981 A | 4/1999 | Kelly | |
| 5,898,389 A | 4/1999 | Deese et al. | |
| 5,977,492 A * | 11/1999 | Taylor et al. | 200/50.32 |
| 5,984,719 A | 11/1999 | Flegel | |
| 6,100,604 A | 8/2000 | Morroni et al. | |
| 6,121,897 A | 9/2000 | Flegel | |
| 6,169,340 B1 | 1/2001 | Jones | |
| 6,172,432 B1 | 1/2001 | Schnackenberg et al. | |
| 6,181,028 B1 | 1/2001 | Kern et al. | |
| 6,184,482 B1 * | 2/2001 | Priem | 200/43.16 |
| 6,222,140 B1 * | 4/2001 | Bachschmid | 200/18 |
| 6,392,170 B1 * | 5/2002 | Wechsler | 200/43.21 |
| 6,424,060 B1 * | 7/2002 | Shiely et al. | 307/328 |
| 6,504,268 B1 | 1/2003 | Flegel | |
| 6,531,790 B2 | 3/2003 | Panuce et al. | |
| 6,563,063 B1 * | 5/2003 | Moore | 200/50.33 |
| 6,861,596 B2 * | 3/2005 | Schnackenberg | 200/43.01 |
| 6,891,284 B2 * | 5/2005 | Tilley | 307/116 |
| 2002/0017821 A1 | 2/2002 | Panuce et al. | |
| 2006/0270280 A1 * | 11/2006 | Sodemann et al. | 439/638 |

* cited by examiner

DO-IT-YOURSELF SYSTEM FOR PORTABLE GENERATOR

CROSS-REFERENCE TO RELATED APPLICATION

This application is a continuation-in-part of U.S. patent application Ser. No. 10/784,370 filed Feb. 23, 2004 now U.S. Pat. No. 7,015,404, the entire contents of which is incorporated herein.

BACKGROUND

The invention generally relates to power distribution. In particular, the invention relates to power distribution from a primary power source or a secondary power source to an appliance.

Residential electrical loads such as furnaces are typically hardwired to an ON-OFF switch box or a load power switch. Unless an automatic transfer switch and a backup power generator are used, supplying electricity to the furnace with a portable generator when there is a power outage is very difficult. When there is no transfer switch and since the portable generator has to be run outdoors, generator extension cords will run from the portable generator to the load via a window or a door.

Standby back up generators are also known. Such standby generators typically use an automatic transfer switch. However, the automatic power switching and the typical standby power generator are costly, and generally require an electrician to install.

SUMMARY

The invention provides a power interface operable to direct power from one of a first source and a second source to a load. The power interface includes a support plate, and a switch extending through the support plate. The switch is electrically connected to the first source and to the load and is movable between a first switch position in which power from the first source is directed to the load, and a second switch position in which power from the first source is inhibited from reaching the load. An electrical connector is electrically connectable to the load and is connectable to the second source to facilitate the delivery of power from the second source to the load. A movable cover is movable between a first cover position in which the cover inhibits connection between the electrical connector and the second source and a second cover position.

The invention also provides an alternate power source connection kit operable to direct power from one of a utility source and an alternative source to a load. The connection kit includes a support plate adapted to connect to an electrical box and an electrical connector coupled to the support plate. The electrical connector is selectively electrically connectable to the alternative source and fixedly electrically connectable to the load. A switch is coupled to the support plate and is fixedly electrically connectable to the load and to the utility source. The switch is movable between a first switch position in which the utility source and the load are electrically connected, and a second switch position in which the utility source and the load are not electrically connected. A cover is movably coupled to the support plate and is movable between a first cover position in which the cover inhibits connection between the alternative source and the electrical connector and a second cover position.

In another construction, the invention provides a power interface operable to direct power from one of a first source and a second source to a load. The power interface includes a support plate and an electrical connector coupled to the support plate and fixedly electrically connected to the load. The electrical connector is selectively connectable to the second source to facilitate the delivery of power from the second source to the load. A cover is movable between a first cover position in which the cover at least partially covers the electrical connector to inhibit connection between the electrical connector and the second source, and a second cover position in which the cover does not inhibit connection between the second source and the electrical connector. A switch is coupled to the support plate and is electrically connected to the first source and to the load. The switch is movable between a first switch position in which the first source is electrically connected to the load and the switch maintains the cover in the first cover position, and a second switch position in which the first source is not electrically connected to the load and the cover is free to move to the second cover position.

In this way, a user of the generator can choose to keep the original load power switch connected to the load, and thus be able to provide only one source of power at a time, or to disconnect power during maintenance. Additionally, using the original load power switch allows the connection box to occupy a relatively small area, and also results in simple wiring within the connection box. A smaller connection box also generally provides flexibility in installation, and is also relatively less expensive to produce. Furthermore, using the original load power switch allows the connection box to use a two-position switch, which is relatively inexpensive.

In another embodiment, the invention allows for the connection of a power interface directly to an existing electrical box. Thus, a second box is not required, thereby simplifying the installation. The power interface is preassembled, may be sold as a retrofit kit, and requires only a few electrical connections before attaching the power interface to the box using the same fasteners as the original cover of the box.

Other features and advantages of the invention will become apparent to those skilled in the art upon review of the following detailed description, claims, and drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
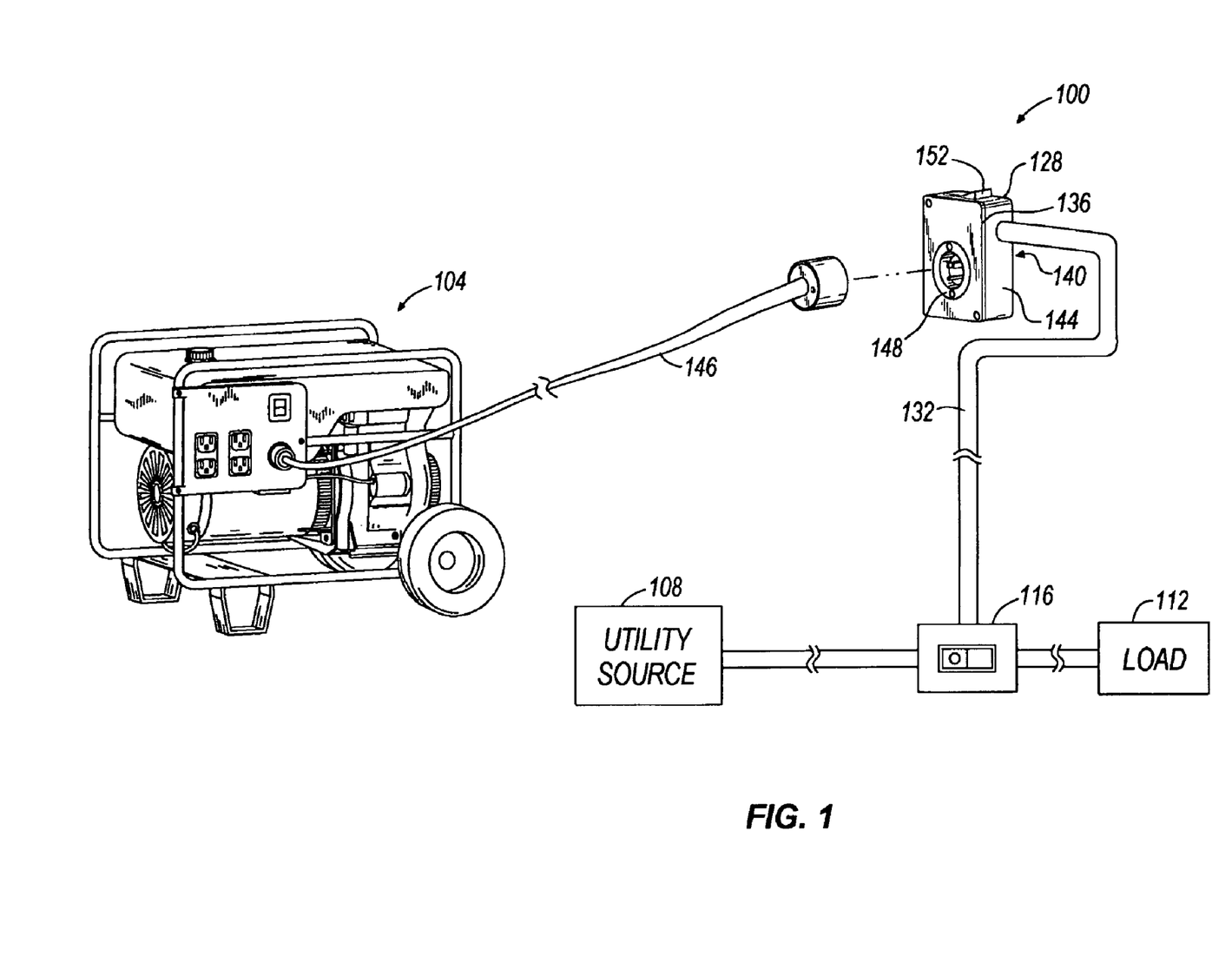
FIG. 1 shows a do-it-yourself ("DIY") system for portable generators according to the present invention.

FIG. 1 shows a do-it-yourself ("DIY") system 100 for portable generators. The DIY system 100 connects power, either from a generator 104 or from a utility or other alternate source 108 to a hard-wired residential load 112. The load 112 is generally connected in circuit to a load power switch 116 that switches power to the load 112. In other embodiments, the load power switch 116 may be integrated with the load 112.

Typical hard-wired residential loads include furnaces, air conditioning units, and the like. When the load power switch 116 is in an ON position, the load power switch 116 connects a selected power source to the load 112. When the load power switch 116 is in an OFF position, the load 112 is disconnected from any power source. In an alternative embodiment, when the load power switch 116 is in the OFF position, the load 112 can be disconnected from the utility power source 108, but connected to the generator 104, detailed hereinafter. In the embodiment shown, the load power switch 116 can be an existing load switch for the load 112.

The DIY system 100 includes a connection box 128, and a power conduit 132. The connection box 128 has a front panel 136, a back 140, and a plurality of side panels 144. The connection box 128 is preferably anchored to a wall at the back 140 of the connection box 128. The front panel 136 has an input plug 148 or other input connector that receives power from the portable generator 104 via a generator power cord 146. Although the input connector 148 is shown disposed on the front panel 136 of the connection box 128, the input connector 148 can also be disposed on one of the side panels 144. The input connector 148 is a male plug, although other connectors can also be used.

In one embodiment, the connection box 128 is mechanically connected to the load power switch 116 via the power conduit 132. The power conduit 132 thus allows the connection box 128 to be placed at any convenient location, or provides a convenient way to at least partially anchor the connection box 128. Although the connection box 128 and the power conduit 132 are shown disposed above and spaced apart from the load power switch 116, the connection box 128 and the power conduit 132 can also be placed at other locations such as below the load power switch 116 depending on the location and the accessibility of the load power switch 116.

The connection box 128 also has a two-position switch 152 on the side panel 144. The two-position switch 152 is connected in circuit with the input connector 148 and thus with the generator 104 in its first position. The two-position switch 152 is connected in circuit with the utility source 108 in its second position. Particularly, when the two-position switch 152 is at the first position, and when the load power switch 116 is in the ON position, generator power is delivered from the generator 104 to the load 112 via the input connector 148.

Also, when the two-position switch 152 is at the second position, and when the load power switch 116 remains in the ON position, utility power is delivered from the utility source 108 to the hard-wired load 112.

Figure 2:
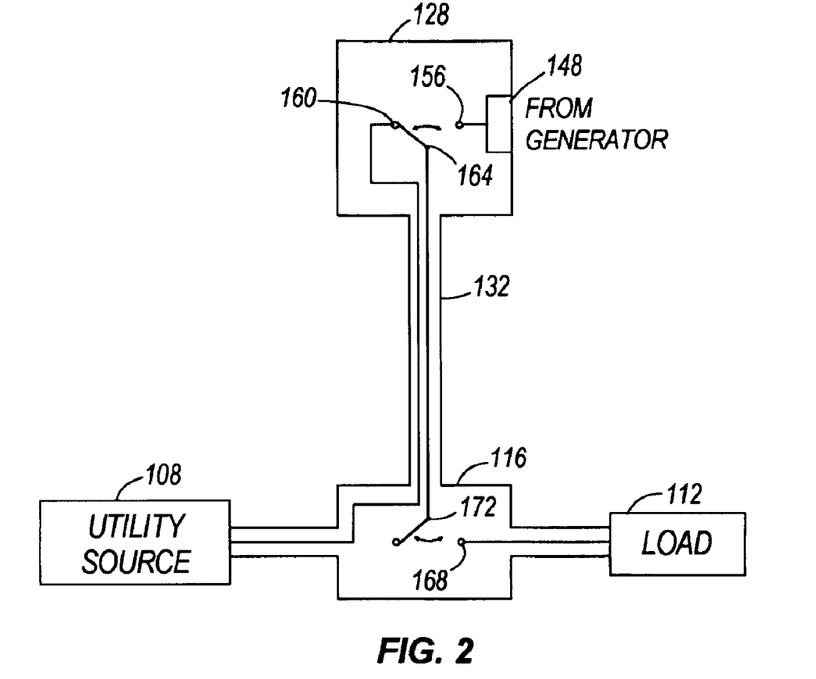
FIG. 2 shows a first electrical circuit according to present invention.

FIG. 2 shows an electrical circuit that may be used with the embodiment in FIG. 1, where like parts are referenced with like numerals. In particular, FIG. 2 shows that the connection box 128, the load power switch 116, and the load 112 are connected and wired in series. FIG. 2 also shows that the connection box 128 receives utility power from the utility source 108 via the power conduit 132 that mechanically connects the connection box 128 and the load power switch 116.

Furthermore, power from the portable generator 104 is available at a first two-position switch contact 156 of the two-position switch 152 via the input connector 148, whereas power from the utility source 108 is available at a second two-position switch contact 160. Specifically, when the first position of the two-position switch 152 is selected, a connection is made between the first two-position contact 156 and a first throw 164. When the ON position of the load power switch 116 is selected, a second connection is also made between an ON contact 168 and a second throw 172, which is also connected to the first throw 164. As a result, the portable generator 104 is connected to the load 112 in series. Similarly, when the second position of the two-position switch 152 is selected, a third connection is made at the two-position switch 152 between the second two-position contact 160 and the first throw 164. Selecting the ON position of the load power switch 116, which makes the second connection at the two-position switch 152, will connect the utility source 108 and the load 112 in series.

Figure 3:
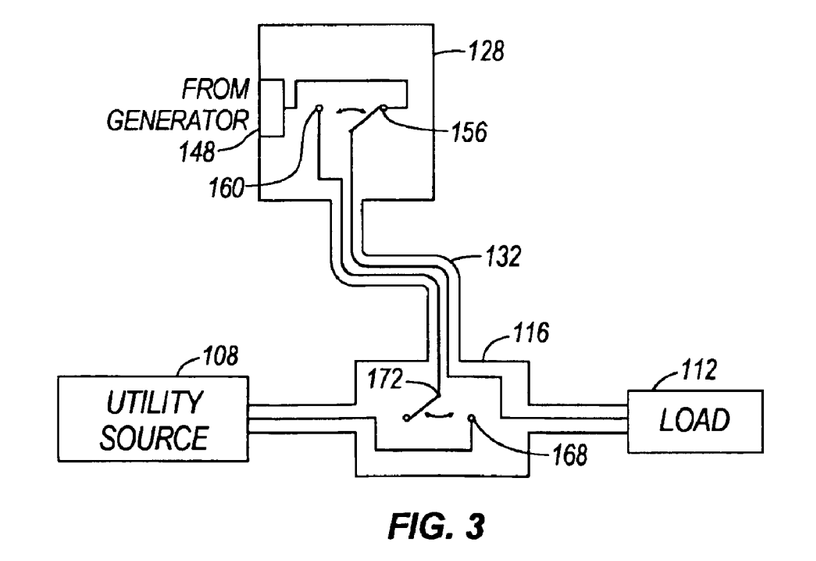
FIG. 3 shows a second electrical circuit according to present invention.

In an alternate circuit shown in FIG. 3, the connection box 128, the load power switch 116, and the load 112 are wired or connected differently. In embodiment shown in FIG. 3, switching the load power switch 116 and the connection box 128 will result in different electrical connections, and provide installation and usage flexibility. For example, FIG. 3 shows that power from the utility source 108 is available at the ON contact 168 of the load power switch 116. Power from the portable generator 104 is shown available at the first two-position switch contact 156 of the two-position switch 152 via the input connector 148. Furthermore, power from the utility source 108 is available at the second two-position switch contact 160 via the second throw 172.

With the wiring arrangement shown in FIG. 3, when the ON position of the load power switch 116 is selected, power from the utility source 108 is provided to the two-position switch 152 as an optional power. In this way, selecting a position on the two-position switch 152 will connect power from either the portable generator 104 or the utility source 108 to the load 112. However, when the OFF position is selected, and if the portable generator 104 is connected to the connection box 128 via the input connector 148, power from the generator 104 can still be provided to the load 112. The OFF position on the load power switch 112 therefore indicates power from the utility source has been disconnected. However, the power from the generator 104 may still be present at the load 112, whereas the ON position simply indicates one of the two power sources has been connected to the load 112.

Referring back to FIG. 2, the present invention also provides a method of connecting generator power to the hard-wired load 112, such as a furnace or an air conditioning unit. When the load 112 has a load power switch 116 that switches power to the hard-wired load 112, the load power switch 116 is first rewired and connected as described hereinafter. The method involves connecting the utility source 108 to the connection box 128, and receiving power from the generator 104 at the input plug or connector 148 of the connection box 128. In this way, the utility source 108 is connected to the connection box 128 at the second two-position switch contact 160 of the two-position switch 152 in circuit through the power conduit 132. After the generator 104 has been connected to the connection box 128 at the input connector 148 on the front panel 136 of the connection box 128, the generator 104 is connected to the connection box 128 at the first two-position contact 156. Thus, power from one of the two power sources 104, 108 is routed back to the load power switch 116 via the power conduit 132.

The method also includes electrically connecting the utility source 108 to the load power switch 116 when the second position of the two-position switch 152 is selected, or electrically connecting the generator 104 to the load power switch 116 when the first position of the two-position switch 152 is selected. That is, when the second position of the two-position switch 152 is selected, the utility source 108 is electrically connected to the load power switch 116 via the second two-position switch contact 160. On the other hand, when the first position of the two-position switch 152 is selected, the generator 104 is electrically connected to the load power switch 116 via the first two-position switch contact 156.

Depending on the position of the load power switch 116, and the position of the two-position switch 152 on the side panel 144 of the connection box 128, power from the generator 104 or from the utility source 108 is either delivered to the load 112 or disconnected. For example, switching the load power switch 116 to an OFF position will electrically disconnect any power to the load 112. Otherwise, switching the load power switch 116 to an ON position will electrically connect power from either the utility source 108 or the generator 104 to the hard-wired load 112. If the embodiment of FIG. 2 is used and the load power switch 116 is in its ON position, selecting the first position 156 and the second position 160 of the two-position switch 152 will electrically connect the generator 104 or the utility source 108 to the load 112, respectively. Similarly, if the embodiment of FIG. 3 is used and the load power switch 116 is in its ON position, selecting the first position and the second position of the two-position switch 128 will electrically connect the generator 104 or the utility source 108 to the load 112, respectively. However, if the embodiment of FIG. 3 is used but the load power switch 116 is in its OFF position, only selecting the first position of the two-position switch 152 will electrically connect any power source to the load 112.

The method also allows for providing a conduit 132 that mechanically connects the connection box 128 and the load power switch 116, and for receiving power from the utility source 108 at the connection box 128 via the conduit 132. The power conduit 132 thus allows the connection box 128 to be placed at any convenient location, for example. Furthermore, positioning the two-position switch 152 on one of the side panels 144 of the connection box 128, for example, allows the connection box 128 to occupy a relatively smaller area, and also provides flexibility in installation. The method also allows for positioning the input plug or connector 148 on the front panel 136 of the connection box 128 to provide easy generator access.

Figure 4:
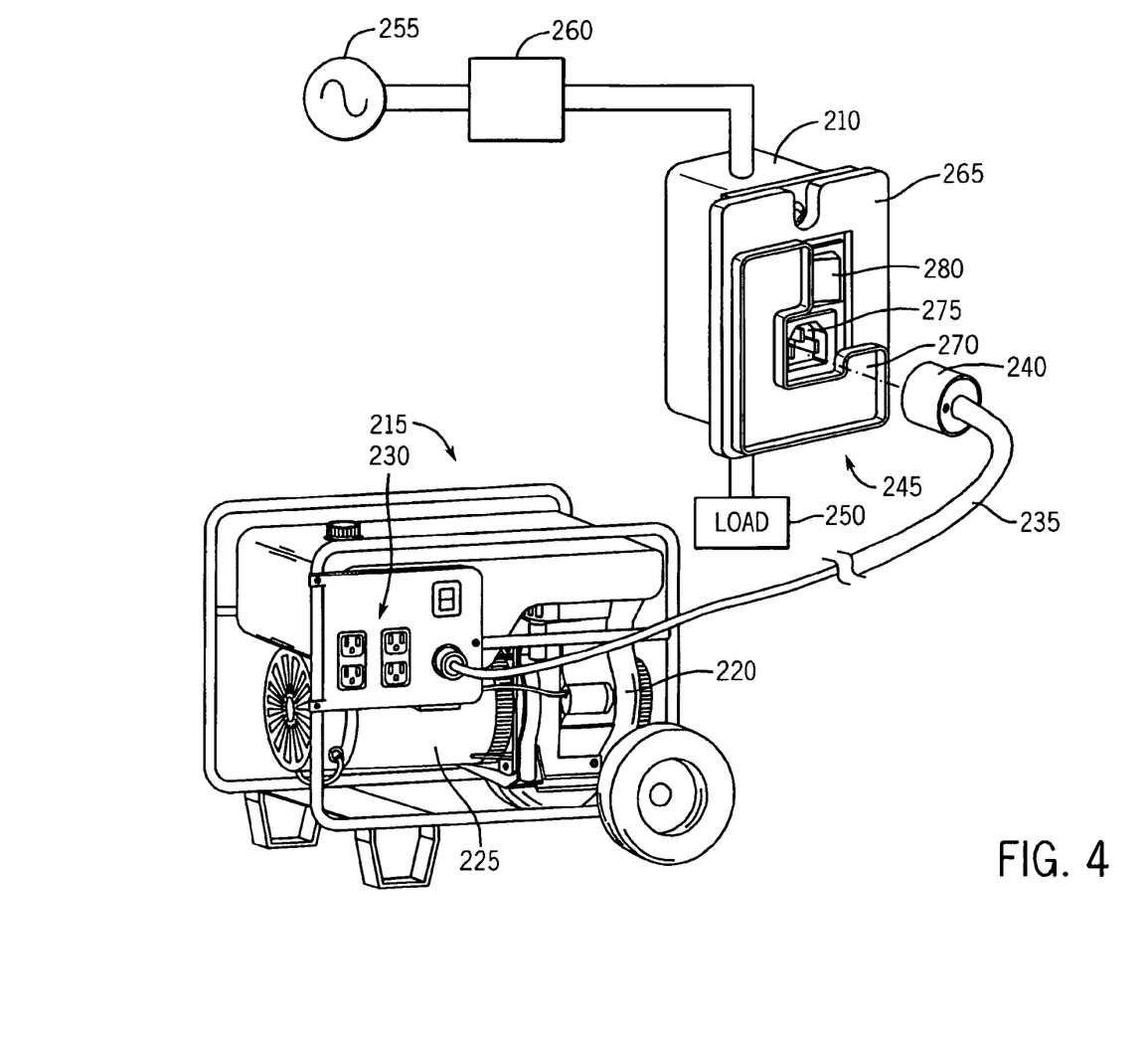
FIG. 4 is a schematic illustration of a portable generator and a power interface according to another embodiment of the invention.

FIGS. 4-11 illustrate another embodiment of the invention in which an alternative or auxiliary power supply connects to a preexisting electrical box 210, rather than to a separate electrical box. With reference to FIG. 4, the alternative or auxiliary power source in the form of a portable generator 215 is illustrated. The portable generator 215 includes an internal combustion engine 220 that is rotationally coupled to an electric machine 225 (e.g., generator, alternator, etc.) such that operation of the internal combustion engine 220 results in an electrical power output from the generator 215. While the illustrated construction employs a portable generator 215 to generate the electrical power output and provide the auxiliary power, other constructions may use alternate sources such as wind turbines, water turbines, solar cells, and the like. As such, the invention should not be limited to systems that employ portable generators 215 having internal combustion engines 220 as the prime mover.

With continued reference to FIG. 4, the generated power is output through one of a plurality of connectors 230 mounted on the generator 215. In the illustrated construction, a power cord 235 extends from one of these connectors and includes a connector 240 that is selectively connectable with a power interface 245. The power interface 245 is disposed between a load 250 and a primary or utility power source 255. Generally, a breaker box 260 or fuse box is positioned between the utility power source 255 and the load 250 to inhibit circuit overloads.

One of ordinary skill in the art will realize that the load 250 could consist of any device or combination of devices that use electricity to function. However, the invention illustrated in FIGS. 4-10 is particularly well suited for use with single devices that are directly wired to the breaker box 260. Examples of these types of devices include furnaces, air conditioners, and the like.

Figure 5:
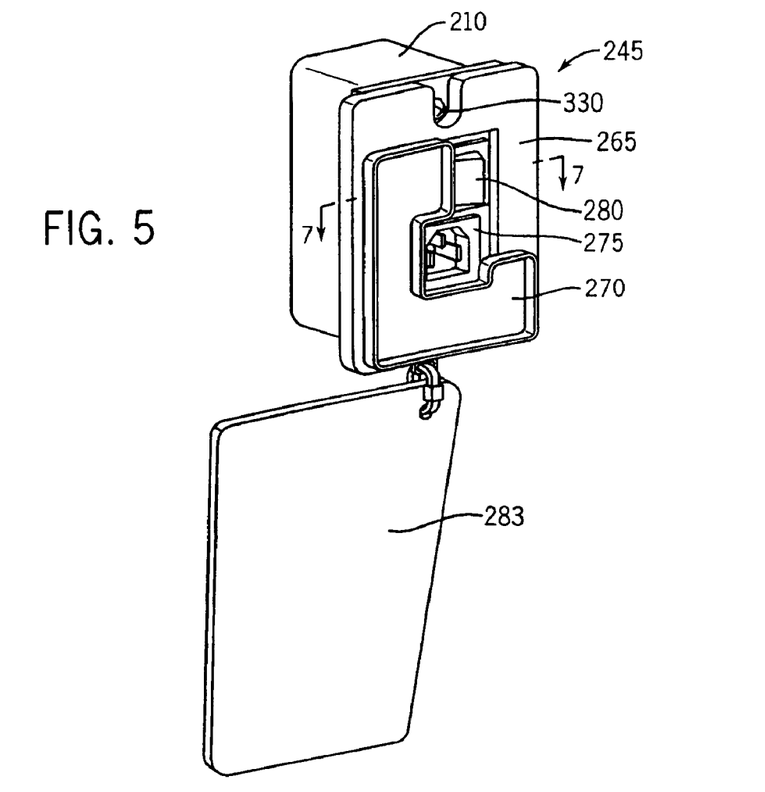
FIG. 5 is a perspective view of the power interface of FIG. 4.
Figure 6:
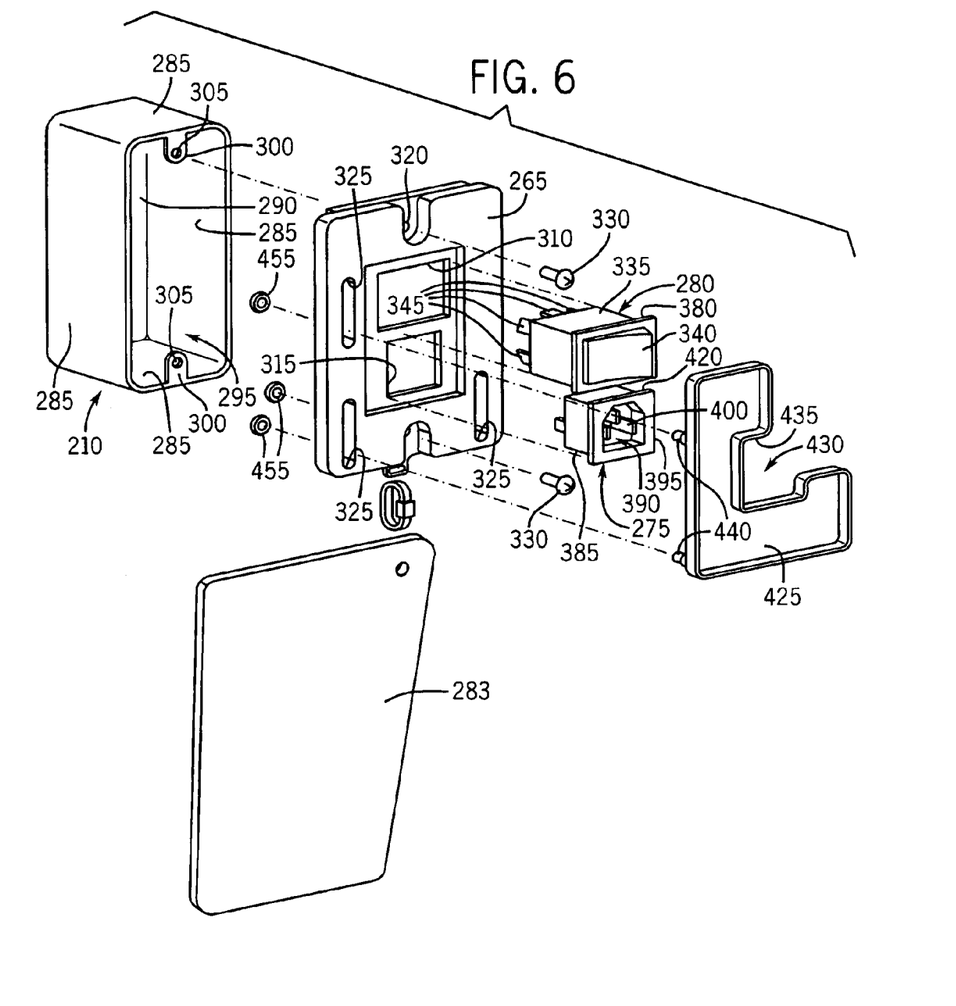
FIG. 6 is an exploded perspective view of the power interface of FIG. 4.

As illustrated in FIGS. 5 and 6, the power interface 245 attaches to the box 210 and includes a support plate 265, a movable cover 270, an electrical connector 275, and a switch 280. In addition, the illustrated construction includes a hanging tag 283 that provides space for operating instructions, installation instructions, and other information that may be useful for the user. Omission of the hanging tag 283 will not affect the operation or construction of the power interface 245.

The box 210 generally includes four walls 285 that are interconnected by a rear surface 290. The four walls 285 cooperate to define a rectangular opening that provides access to a space 295 defined by the four walls 285 and the rear surface 290. The box 210 also includes two tabs 300 that extend inward from two opposed walls 285. Generally, each tab 300 includes a threaded aperture 305 positioned and sized to facilitate the attachment of a cover to the box 210. Boxes 210 of this type are commonly used to house electrical wires and connections within a building.

The support plate 265 includes two rectangular apertures 310, 315, two fastener apertures 320 (one shown), and three elongated slots 325. The fastener apertures 320 are sized to receive a fastener 330 and to allow only a portion of the fastener 330 to pass through. The apertures 320 are positioned such that they align with the threaded apertures 305. Arranged as illustrated, the fasteners 330 can pass through the fastener apertures 320 and threadably engage the box 210 to attach the support plate 265 to the box 210. While other attachment systems are possible, the illustrated arrangement is preferred because it allows the power interface 245 to attach to many conventional boxes 210 without modification to the box 210. Rather, the preexisting cover for the box 210 is removed and is replaced by the support plate 265.

Figure 10:
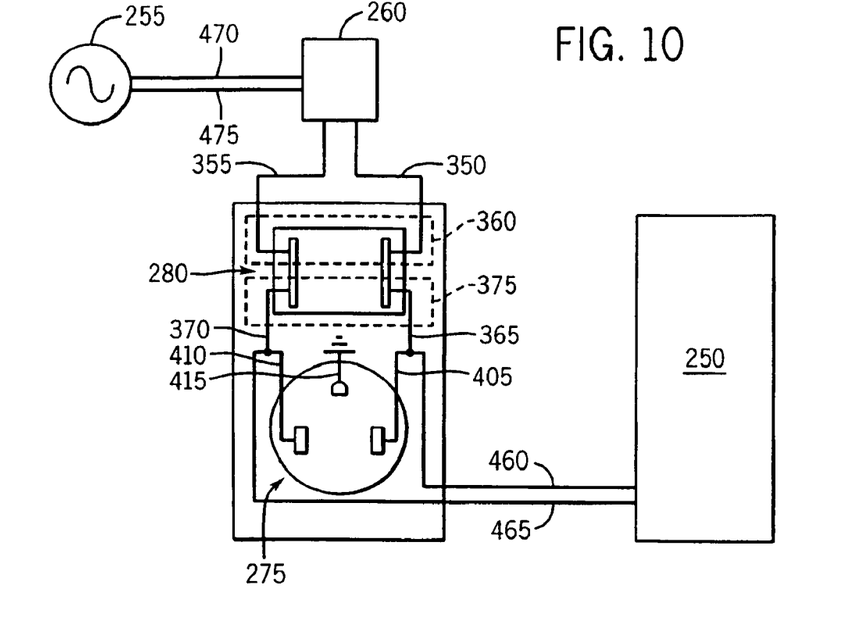
FIG. 10 is an electrical schematic illustrating the electrical connections of the power interface of FIG. 4 with the switch in a first position.
Figure 11:
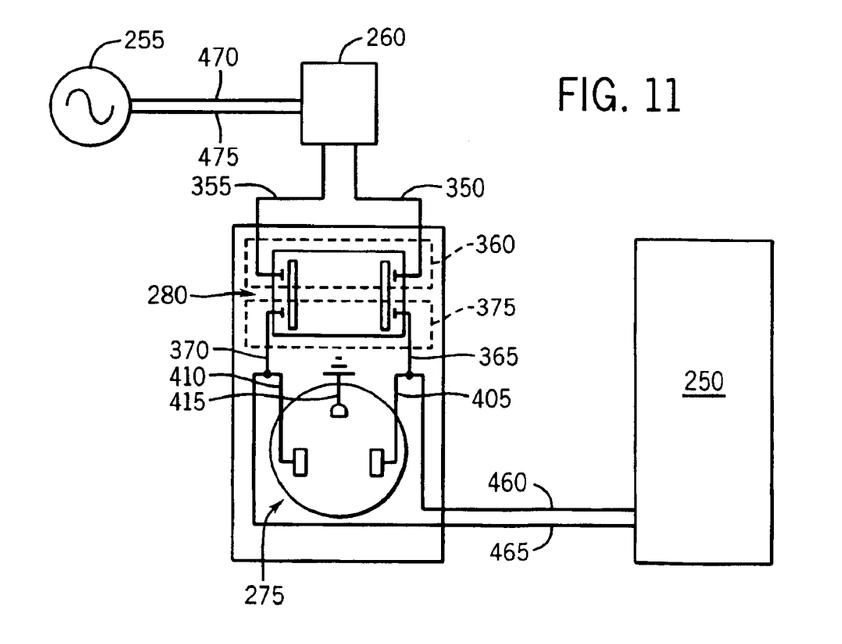
FIG. 11 is an electrical schematic illustrating the electrical connections of the power interface of FIG. 4 with the switch in a second position.

The switch 280 includes a switch housing 335 that encloses the internal contacts of the switch 280, and a rocker 340 or other movable member that allows a user to change the connection of the contacts within the switch 280. In the illustrated construction, a two-position rocker switch 280 or double pole single throw (DPST) switch 280 is employed, with other switch arrangements also being possible. A plurality of connectors 345 extend from the housing 335 to allow for the connection of electrical conductors to the switch 280. At least four connectors 345 are employed to allow for the connection of the switch 280, with an additional or ground connector also being possible. As illustrated and discussed with regard to FIGS. 10 and 11, the switch 280 includes a hot lead 350 and a neutral lead 355 on an input side 360 of the switch 280, and a hot lead 365 and a neutral lead 370 on an output side 375 of the switch 280. When the switch 280 is in a first position, the hot leads 350, 365 and the neutral leads 355, 370 of the input and output sides 360, 375 are connected as shown in FIG. 10, and when the switch 280 is in the second position the input and output sides 360, 375 are not electrically connected, as shown in FIG. 11.

With reference to FIG. 6, the switch housing 335 defines a shoulder 380 that engages the support plate 265 to properly locate the switch 280. In some constructions, the housing 335 includes a locking member 383 (shown in FIG. 7) that passes through the switch aperture 310 and then springs outward to engage the back of the support plate 265 to lock the switch 280 in position. In still other constructions, a press or tight fit, fasteners, adhesives, or other attachment means is employed to hold the switch 280 in the desired position. Also, it should be noted that the switch aperture 310 is sized and shaped to receive the switch 280. As such, other constructions that employ other switches may require differently sized or shaped apertures to properly receive the switch.

The electrical connector 275 includes a housing 385 that defines a recess 390 in which a standard male receptacle 395 is positioned. The illustrated male plug 395 includes three prongs 400 that extend outward from the bottom of the recess but that do not extend beyond the recess. The prongs 400 are arranged to receive the standard female receptacle 240 such as is employed on many 120-volt, 15 amp electrical cords 235, as shown in FIG. 4. Thus, two of the prongs 400 cooperate to at least partially define a circuit, with one of the prongs 400 being the hot prong and the other being the neutral prong, with the third prong 400 being a ground prong. Of course other male plugs, female receptacles, or combinations may also be employed if desired. For example, a 120-volt, 20 amp male plug, or a standard single-phase 240-volt receptacle or plug could be employed as could a three-phase 240-volt connector. Each of these connectors includes a slightly different arrangement than the one illustrated to inhibit the connection of incompatible power sources.

In the illustrated construction, three connectors extend out the opposite side of the housing 385, with each connector electrically connected to one of the prongs 400. Thus, the electrical connectors define a hot lead 405, a neutral lead 410, and a ground lead 415 as illustrated in FIGS. 10 and 11. The location of the connectors 405, 410, 415 provides for easy electrical connection to the electrical connector 275 in a way that allows for the wires and all of the connections to be disposed within the box 210.

With reference to FIG. 6, the electrical connector housing 385 includes a shoulder 420 similar to the switch shoulder 380. The shoulder 420 engages the support plate 265 to properly locate the electrical connector 275. As with the switch housing 335, the electrical connector housing 385 may include a locking member (not shown) that passes through the aperture 315 and then springs outward to engage the support plate 265 to inhibit the unwanted removal of the electrical connector 275. Alternatively, a press or tight fit, adhesives, fasteners, or the like could be employed to attach the electrical connector to the support plate. Also, it should be noted that the electrical connector aperture 315 is sized and shaped to receive the electrical connector 275. As such, other constructions that employ other electrical connectors may require differently sized or shaped apertures to properly receive the electrical connector.

The movable cover 270 includes a plate 425 that could be substantially rectangular or square with approximately one quadrant removed. Alternately the plate may have another shape. The plate 425 includes a central aperture 430 sized to receive the female receptacle 240 or other cord connector. The central aperture 430 is at least partially defined by a switch-engaging surface 435 that extends along a portion of the central aperture 430. Three pins 440 (two shown in FIG. 6) extend from the rear surface of the plate 425 such that each pin 440 is substantially parallel to the other pins 440 and is substantially normal to the plate 425. Two pins 440 are located on one side of the plate 425 and are spaced apart a distance defined by the distance between the two slots 325 formed in the same side of the support plate 265. The third pin 440 is disposed on the opposite side of the plate 425 and engages the slot 325 formed in the opposite side of the support plate 265. Of course, other constructions may employ fewer or more than three pins 440 or differently arranged or oriented pins 440 if desired. In addition, some or all of the pins 440 may be located on the support plate 265 rather than the plate 425, with the corresponding slots formed in the plate 425 or the support plate 265. Alternately, other slide arrangements could be used.

Figure 7:
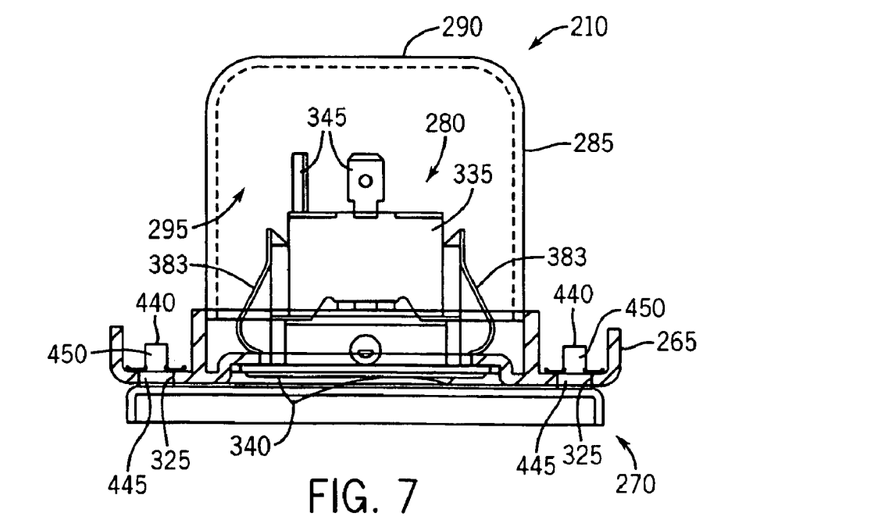
FIG. 7 is a section view of the power interface of FIG. 4 taken along line 7-7 of FIG. 5.

As illustrated in FIG. 7, the pins 440 include a guide portion 445 and a lock-engaging portion 450 that extends from the guide portion 445. The guide portions 445 are sized to closely engage the elongated slots 325 when the plate 425 is placed adjacent the support plate 265. Lock washers or connectors 455 slide over the pins 440 behind the support plate 265 and engage the lock-engaging portions 450 to inhibit movement of the plate 425 in a direction substantially parallel to the pins 440. Thus, the movable cover 270 is constrained to move along a line or in a direction that is substantially parallel to, and defined by the three slots 325 formed in the support plate 265. The length of the slots 325 also limits the amount of movement of the movable cover 270 such that it is movable between a first position (shown in FIG. 8) and a second position (shown in FIG. 9). In alternate embodiments, other ways could be used to retain the slide.

To assemble the power interface 245, one first inserts the switch 280 and the electrical connector 275 into the support plate 265. Each component 275, 280 is simply pushed into the corresponding aperture 310, 315 until the corresponding locking members 383 pass through the aperture 310, 315 and spring outward to lock the component 275, 280 in place. In some arrangements a resilient gasket is positioned between the support plate 265 and the shoulder 380, 420 of one or each of the components 275, 280 to provide a better seal and to provide a biasing force that holds the locking members 383 against the support plate 265 to inhibit unwanted vibration or movement. The plate 425 is next positioned such that the pins 440 extend through their respective slots 325. The lock washers 455 slide onto the pins 440 and engage the lock-engaging portion 450 to complete the assembly of the movable cover 270 and to inhibit the removal of the movable cover 270, while still allowing linear movement of the cover 270.

To install the power interface 245, the user must electrically connect the load 250 and the utility power supply 255 to the power interface 245. FIGS. 10 and 11 illustrate one possible circuit arrangement that will allow operation of the power interface 245. In the illustrated arrangement, the hot lead 350 and neutral lead 355 on the input side 360 of the switch 280 are fixedly electrically coupled to the utility or primary power supply 255. The hot lead 365 from the output side 375 of the switch 280 is fixedly electrically connected to the hot lead 405 from the electrical connector 275 and a hot lead 460 that extends to the load 250. Similarly, the neutral lead 370 from the output side 375 of the switch 280 is fixedly electrically connected to the neutral lead 410 from the electrical connector 275 and a neutral lead 465 that extends to the load 250. Generally, the three hot leads 350, 365, 460 are connected to one another using a WIRE-NUT brand twist-on wire connector, a bus, or other connection that electrically connects the three leads 350, 365, 460. Similarly, the three neutral leads 355, 370, 465 are connected to one another using a WIRE-NUT brand twist-on wire connector, a bus, or other connection that electrically connects the three leads 355, 370, 465.

Arranged as illustrated, the switch 280 is not operatively connected to the electrical connector 275, as the position of the switch 280 does not affect the operation of the electrical connector 275. While the switch 280 is electrically connected to the electrical connector 275, there is no operative relationship.

Before proceeding, it should be noted that the term "fixedly electrically connected" is intended to cover any electrical connection, that through normal use and operation is not intended to be broken or interrupted. For example, three leads connected with a WIRE-NUT brand twist-on wire connector are fixedly electrically connected even though the simple, but abnormal, removal of the WIRE-NUT brand twist-on wire connector would break the connection.

Figure 8:
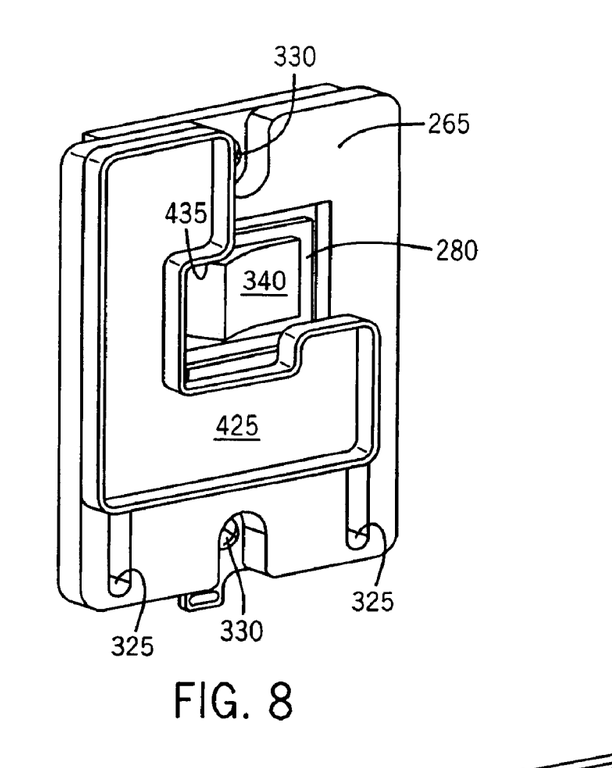
FIG. 8 is a perspective view of a portion of the power interface of FIG. 4 including a movable cover in a first position.
Figure 9:
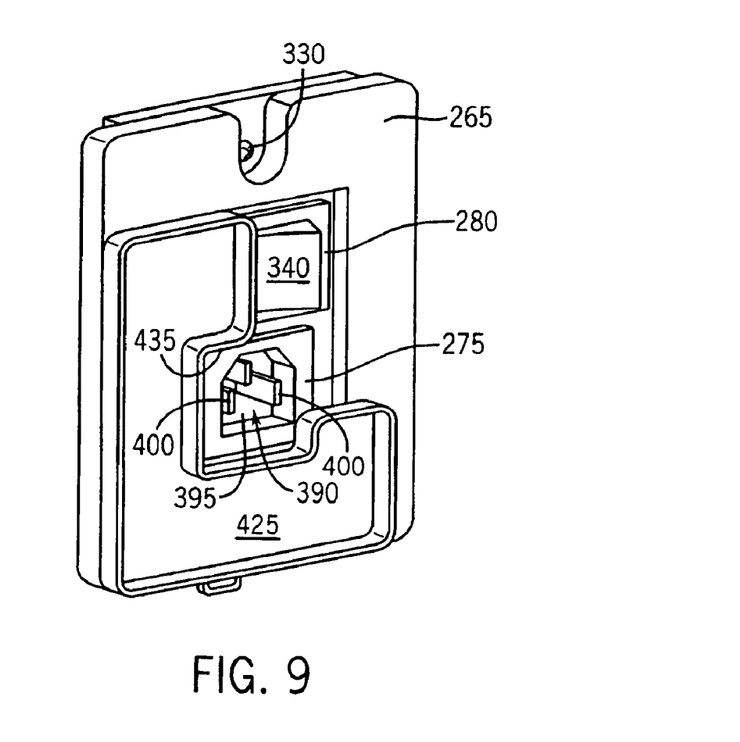
FIG. 9 is a perspective view of a portion of the power interface of FIG. 4 including a movable cover in a second position.

In use, the user selects the desired source of power by positioning the movable cover 270 and switch 280 as illustrated in FIG. 8 or FIG. 9. To select utility or primary power, the user arranges the power interface 245 as illustrated in FIG. 8. Specifically, the user slides the movable cover 270 upward such that the switch 280 is substantially disposed within the cover central aperture 430 and the electrical connector 275 is covered by the movable cover 270. The switch 280 is moved to the closed position such that the portion of the rocker 340 adjacent the switch-engaging surface 435 extends through the cover central aperture 430. In this arrangement, the rocker 340 engages the switch-engaging surface 435 and interferes with the downward movement of the cover 270. Thus, the cover 270, in the first position illustrated in FIG. 8, inhibits access to the electrical connector 275. Of course, the cover or movable plate could move in another direction, or use another mechanism could be used to cover the plug.

With reference to FIG. 10, with the switch 280 in the first position, the input side 360 and the output side 375 of the switch 280 are connected. Thus, a hot lead 470 from the utility power supply 255 is electrically connected to the hot lead 365 from the output side 375 of the switch 280, the hot lead 405 from the electrical connector 275, and the hot lead 460 from the load 250. Similarly, a neutral lead 475 from the utility power supply 255 is electrically connected to the neutral lead 370 from the output side 375 of the switch 280, the neutral lead 410 from the electrical connector 275, and the neutral lead 465 from the load 250. As such, power is supplied to the load 250 by the utility power supply 255. However, because the movable cover 270 covers the electrical connector 275, any power delivered to the electrical connector 275 cannot be used or accessed by the user.

To switch to the auxiliary power supply or portable generator 215 as described in the present construction, the user first reconfigures the power interface 245 such that it is arranged as illustrated in FIG. 9. Specifically, the user first moves the switch 280 to the second position. With the switch 280 in the second position, the movable cover 270 moves downward to expose the electrical connector 275. In addition, the movable cover 270 covers a portion of the switch rocker 340 such that the switch 280 cannot be easily moved back to the first position. The user engages the female connector 240 from the auxiliary power supply 215 with the electrical connector 275 to feed power to the electrical connector 275.

Turning to FIG. 11, the hot lead 405 from the electrical connector 275 remains connected to the hot lead 365 from the output side 375 of the switch 280 and the hot lead 460 from the load 250. Similarly, the neutral lead 410 from the electrical connector 275 remains connected to the neutral lead 370 from the output side 375 of the switch 280 and the neutral lead 465 from the load 250. As such, power is provided to the load 250 from the auxiliary power supply 215. The position of the switch contacts (i.e., open) assures that power from the input side 360 is not delivered to the output side 375, thus cutting off the utility power supply 255.

In preferred arrangements, the power interface 245 is provided as a kit that allows the user to install the power interface 245 to allow for easy connection of the auxiliary power supply 215 to the load 250. In such an arrangement, the power interface 245 replaces the cover of the typical electrical switch box 210 that provides power to the load 250.

It should be noted that the term "utility power supply" has been used to describe one of the sources of power for the load 250. However, there is no requirement that the power supply actually be provided by a utility. For example, the invention described herein will function when the "utility power supply" is provided by a stand-alone power source such as a series of solar cells. In this arrangement, an auxiliary power supply, such as the portable generator illustrated in FIG. 4 may be employed to provide power when the primary or "utility power" supply is not available, such as, in this example during long periods without sunshine.

While the construction illustrated in FIGS. 4-11 has been described as including a double pole single throw switch, another construction includes a double pole double throw switch. The double pole double throw switch is movable to a first switch position in which the switch disconnects the electrical connector from the load and the utility power supply, and connects the utility power supply to the load. The switch can also be moved from the first switch position to a second switch position in which the switch connects the electrical connector to the load and disconnects the utility power supply from the load. IN preferred arrangements a two position double pole double throw switch is employed with other switches also being possible. The use of the double pole double throw switch allows the utility power supply and the electrical connector to be isolated from one another. Specifically, the electrical connector never connects to or receives power from the utility power supply.

Various features and advantages of the invention are set forth in the following claims.

What is claimed is:

1. A power interface operable to direct power from one of a first source and a second source to a load, the power interface comprising:

a support plate;

a switch extending through the support plate, electrically connected to the first source and to the load and movable between a first switch position in which power from the first source is directed to the load and a second switch position in which power from the first source is inhibited from reaching the load;

an electrical connector, electrically connectable to the load, and connectable to the second source to facilitate the delivery of power from the second source to the load; and a movable cover coupled to the support plate and movable between a first cover position in which the cover inhibits connection between the electrical connector and the second source and a second cover position.

2. The power interface of claim 1, wherein the switch includes a two-position switch.

3. The power interface of claim 1, wherein the electrical connector includes a male plug including three separate prongs.

4. The power interface of claim 1, wherein the electrical connector is fixedly electrically connected to the load.

5. The power interface of claim 1, wherein the support plate connects to a box and the movable cover slidably engages the support plate.

6. The power interface of claim 5, wherein one of the support plate and movable cover includes a slot and the other of the support plate and the movable cover includes a pin engageable with the slot to guide the movement of the movable cover.

7. The power interface of claim 1, wherein a portion of the movable cover covers the electrical connector when the movable cover is in the first cover position.

8. The power interface of claim 1, wherein the switch engages the cover and inhibits movement of the cover from the first cover position when the switch is in the first switch position.

9. The power interface of claim 1, wherein the movable cover inhibits movement of the switch from the second switch position to the first switch position when the movable cover is in the second cover position.

10. An alternate power source connection kit operable to direct power from one of a utility source and an alternative source to a load, the connection kit comprising:
    a support plate adapted to connect to an electrical box;
    an electrical connector coupled to the support plate, the electrical connector selectively electrically connectable to the alternative source and fixedly electrically connectable to the load;
    a switch coupled to the support plate and fixedly electrically connectable to the load and to the utility source, the switch movable between a first switch position in which the utility source and the load are electrically connected and a second switch position in which the utility source and the load are not electrically connected; and
    a cover movably coupled to the support plate and movable between a first cover position in which the cover inhibits connection between the alternative source and the electrical connector and a second cover position.

11. The connection kit of claim 10, wherein the switch includes a two-position switch.

12. The connection kit of claim 10, wherein the electrical connector includes a male plug including three separate prongs.

13. The connection kit of claim 10, wherein the cover is slidably connected to the support plate.

14. The connection kit of claim 13, wherein one of the support plate and cover includes a slot and the other of the support plate and the cover includes a pin engageable with the slot to guide the movement of the cover.

15. The connection kit of claim 10, wherein a portion of the cover covers the electrical connector when the cover is in the first cover position.

16. The connection kit of claim 10, wherein the switch engages the cover and inhibits movement of the cover from the first cover position when the switch is in the first switch position.

17. The power interface of claim 10, wherein the cover inhibits movement of the switch from the second switch position to the first switch position when the cover is in the second cover position.

18. A power interface operable to direct power from one of a first source and a second source to a load, the power interface comprising:
    a support plate;
    an electrical connector coupled to the support plate and fixedly electrically connected to the load, the electrical connector selectively connectable to the second source to facilitate the delivery of power from the second source to the load;
    a cover coupled to the support plate and movable between a first cover position in which the cover at least partially covers the electrical connector to inhibit connection between the electrical connector and the second source, and a second cover position in which the cover does not inhibit connection between the second source and the electrical connector; and
    a switch coupled to the support plate and electrically connected to the first source and to the load, the switch movable between a first switch position in which the first source is electrically connected to the load and the switch maintains the cover in the first cover position, and a second switch position in which the first source is not electrically connected to the load and the cover is free to move to the second cover position.

19. The power interface of claim 18, wherein the switch includes a two-position switch.

20. The power interface of claim 18, wherein the electrical connector includes a male plug including three separate prongs.

21. The power interface of claim 18, wherein the cover is slidably connected to the support plate.

22. The power interface of claim 21, wherein one of the support plate and cover includes a slot and the other of the support plate and the cover includes a pin engageable with the slot to guide the movement of the cover.

23. The power interface of claim 18, wherein the cover inhibits movement of the switch from the second switch position to the first switch position when the cover is in the second cover position.

* * * * *